US008786994B2

(12) United States Patent
Barenthin et al.

(10) Patent No.: US 8,786,994 B2
(45) Date of Patent: Jul. 22, 2014

(54) ARRANGEMENT COMPRISING A SURGE ARRESTER

(75) Inventors: Gundolf Barenthin, Berlin (DE); Erhard Pippert, Dallgow-Doeberritz OT Seeburg (DE); Dirk Springborn, Berlin (DE); Markus Sulitze, Falkensee (DE)

(73) Assignee: Siemens Aktiengesellschaft, Munich (DE)

(*) Notice: Subject to any disclaimer, the term of this patent is extended or adjusted under 35 U.S.C. 154(b) by 137 days.

(21) Appl. No.: 12/866,367

(22) PCT Filed: Jan. 21, 2009

(86) PCT No.: PCT/EP2009/050628
§ 371 (c)(1),
(2), (4) Date: Aug. 5, 2010

(87) PCT Pub. No.: WO2009/098121
PCT Pub. Date: Aug. 13, 2009

(65) Prior Publication Data

US 2010/0321850 A1 Dec. 23, 2010

(30) Foreign Application Priority Data

Feb. 5, 2008 (DE) ........................ 10 2008 008 022

(51) Int. Cl.

| | |
|---|---|
| ***H02H 1/00*** | (2006.01) |
| *H02H 1/04* | (2006.01) |
| *H02H 3/22* | (2006.01) |
| *H02H 9/06* | (2006.01) |
| *H02G 13/00* | (2006.01) |

(52) U.S. Cl.
USPC ........... 361/117; 361/126; 361/129; 361/130; 174/2

(58) Field of Classification Search
USPC ................. 361/117, 126, 127, 128, 129, 130; 174/2; 313/231.11
See application file for complete search history.

(56) References Cited

U.S. PATENT DOCUMENTS

| | | | |
|---|---|---|---|
| 2,414,732 | A | 1/1947 | Fox |
| 3,588,773 | A | 6/1971 | Carothers |
| 4,349,855 | A | 9/1982 | Nagai |
| 4,761,707 | A | 8/1988 | Wakamatsu et al. |
| 4,797,781 | A | 1/1989 | Kluge |
| 4,864,455 | A | 9/1989 | Shimomura et al. |
| 2010/0103581 | A1 | 4/2010 | Kruska et al. |

FOREIGN PATENT DOCUMENTS

| | | | |
|---|---|---|---|
| BE | 361814 | A | 7/1929 |
| DE | 7225279 | U | 10/1980 |
| DE | 3636009 | C2 | 3/1989 |
| DE | 3882219 | T2 | 12/1993 |
| DE | 102007010857 | A1 | 9/2008 |

(Continued)

OTHER PUBLICATIONS

German Search Report dated Sep. 24, 2008.

*Primary Examiner* — Hoa C Nguyen
*Assistant Examiner* — Binh Tran
(74) *Attorney, Agent, or Firm* — Laurence A. Greenberg; Werner H. Stemer; Ralph E. Locher

(57) ABSTRACT

A configuration includes a surge arrester. The surge arrester includes first and second connecting terminals. At least one connecting terminal is connected to an electrically conductive connecting path to contact the surge arrester. The connecting path is mounted in a universally jointed manner.

6 Claims, 2 Drawing Sheets

(56) References Cited

FOREIGN PATENT DOCUMENTS

| | | | | |
|---|---|---|---|---|
| EP | 0004349 | A1 | | 10/1979 |
| FR | 804678 | A | | 10/1936 |
| FR | 2483133 | A2 | | 11/1981 |
| RU | 2312441 | C2 | | 12/2007 |
| WO | 9710631 | A1 | | 3/1997 |
| WO | 0028624 | A1 | | 5/2000 |
| WO | WO 0025389 | | * | 5/2000 |

* cited by examiner

ARRANGEMENT COMPRISING A SURGE ARRESTER

BACKGROUND OF THE INVENTION

Field of the Invention

The invention relates to an arrangement having a surge arrester with a first connecting terminal and a second connecting terminal, wherein an electrically conductive connecting path is fitted to at least one of the connecting terminals in order to make contact with the surge arrester.

By way of example, one such arrangement is known from PCT laid-open specification WO 97/10631, which describes a surge arrester which has two connecting terminals, wherein the connecting terminals are used to make contact with the surge arrester. An electrically conductive connecting path is fitted to one of the connecting terminals. Connections which connect the connecting path at a fixed angle to the surge arrester are provided in order to make contact with the connecting path. Appropriate lugs are used for this purpose, which are aligned radially with respect to a longitudinal axis of the surge arrester. This requires a relatively large physical space. The projecting lugs make it harder to handle the arrangement. Furthermore, the lugs offer points for external forces to act on, which can cause mechanical damage.

BRIEF SUMMARY OF THE INVENTION

The object of the invention is therefore to design an arrangement of the type mentioned initially so as to make it possible to reduce the physical space required.

According to the invention, in the case of an arrangement of the type mentioned initially, this is achieved in that the connecting path is borne in a universally jointed manner.

A universally jointed bearing for the connecting path makes it possible to arrange this in a pendular form. This avoids configurations in the connecting path occupying a physical space at a fixed angle. It is therefore possible to complete the surge arrester, for example with parts of the connecting path, even before final assembly. Furthermore, a universally jointed bearing makes it possible to decouple forces between the surge arrester and the connecting path. Forces which act on the connecting path are kept away from the surge arrester by the universally jointed bearing. This also applies in the opposite sense. For example, it is therefore possible to use the arrangement according to the invention even in severe open-air conditions. For example, surge arresters can be used in the open-air area, where they are subject to corresponding weather influences. In particular, wind loads which occur can lead to fatigue of the arrangement, because of repeated load cycling. Decoupling the surge arrester and the connecting path now makes it possible to hold these two elements independently of one another and to arrange these two elements in a stress-free manner, with a common bearing. For example, this makes it possible to deliberately allow a relative movement between the surge arrester and the connecting path.

A universally jointed bearing of a connecting path can be provided on one of the terminals or on both terminals.

A further advantageous refinement makes it possible for a universal joint to be held by one connecting terminal.

If the universal joint which is used as universally jointed suspension for the connecting path is attached to the surge arrester, then at least parts of the connecting path can be held jointly with the surge arrester. Despite using the mechanical resistance capability of the surge arrester to hold the connecting path, fixed-angle connections between the connecting path and the surge arrester are very largely avoided. A universal joint allows a relative movement between its joint elements about at least two axes. These axes should preferably be orthogonal to one another. This ensures a pendular movement of at least sections of the connecting path which are located in the vicinity of the surge arrester. A section of the connecting path which is located in the vicinity of the surge arrester should preferably be held by the surge arrester itself, or jointly with it.

By way of example, the universal joint can be connected by a joint element to a connecting terminal of the surge arrester. For example, the surge arrester can be held on one of the connecting terminals. The holding apparatus which is provided for holding can likewise hold the universal joint indirectly or directly.

It is advantageously also possible to provide for the universal joint to be short-circuited by the connecting path.

The universal joint should have as long a life as possible. Joints which are constructed from simple machine elements with a high mechanical resistance capability are suitable for this purpose.

Machine elements such as these typically cost little and are manufactured in large quantities from metallic semi-finished products such as profiled bars, etc. The metallic semi-finished products have an adequate resistance capability to environmental influences, possibly after appropriate surface treatment. If the universal joint is short-circuited, this neutralizes the possibility of parallel current paths being formed via the joint to the connecting path. In order to short-circuit the universal joint, it is possible to provide a flexible conductor element of the connecting path which bridges the universal joint. In this case, this flexible conductor element of the connecting path can be held on the universal joint. If the flexible conductor element is laid in an appropriate curved shape, the freedom of movement of the universal joint is restricted only in an order of magnitude which is negligible for this application.

It is also advantageously possible for the universal joint to have two brackets which engage in one another.

Two brackets which engage in one another make it possible to design a physically simple universal joint which ensures effortless decoupling of relative movements between the surge arrester and the connecting path. The brackets can be used to produce joint elements which allow relative movements about at least two mutually orthogonal axes. By way of example, wires bent in a U-shape, and which engage in one another, can be used as brackets. In this case, it is possible for the brackets to be intrinsically closed or to be closed by further elements, thus preventing one bracket being removed from the other bracket. For example, it is possible for at least one of the brackets to represent a closed eye, with the other bracket passing through the hole in the eye. It is also possible for both brackets to be in the form of eyes, with the eyes being interleaved with one another.

The joint elements can act as part of the connecting path. For this purpose, the connecting points which are provided for the universally jointed connection can make electrical contact with one another between the joint elements. This can be assisted, for example, by contact elements such as laminates or the like, thus resulting in a permanent electrically conductive connection. In a situation such as this, there is no need to short-circuit the universal joint.

Furthermore, it may be advantageous for the connecting path to be attached at a fixed angle to at least one of the brackets.

When just one bracket is connected at a fixed angle to the connecting path, this makes it possible to use one bracket to hold the connecting path. The joint can therefore be used to position at least parts of the connecting path. In this case, it is also possible for sections of the universal joint to be used as a connecting path, and for a current flow from/to a connecting terminal of the surge arrester to pass through the sections.

It is advantageously also possible for a connecting path disconnecting device to be attached at a fixed angle to at least one of the brackets.

A connecting path disconnecting device can be used to interrupt the connecting path in the event of a fault in the arrangement. For example, for this purpose, the connecting path disconnecting device may have a switching gap which results in irreversible opening of the connecting path. By way of example, a propellant charge can be used for irreversible opening, which destroys the connecting path at a point. The connecting path disconnecting device may advantageously have a rotationally symmetrical structure which is introduced in the course of the connecting path. If connected at a fixed angle to one of the brackets of the universal joint, this allows the masses of the connecting path disconnecting device to be held adequately, in which case the connecting path disconnecting device is very largely decoupled from forces which act on the surge arrester or originate from it.

It is advantageously also possible for the brackets to have different bending radii.

The use of different bending radii for the brackets makes it possible to adjust a clearance which can occur between the brackets. For example, this means that it is possible to provide a movement about a specific axis, preferably via one of the two brackets. In combination with the various preferably supported axes, it is also possible to allow a free pendular movement for example of the connecting path disconnecting device. A degree of deflection of the connecting path disconnecting device can then be determined essentially by the configuration of the connecting path.

A further advantageous refinement allows at least one of the brackets to be connected at a fixed angle to one connecting terminal.

A connection at a fixed angle of at least one of the brackets makes it possible to use the connecting terminal as a holding element for the universal joint. In this case, it is advantageous for that bracket which is not connected to a connecting terminal to be connected at a fixed angle to the connecting path such that, in a sequence starting from the connecting terminal, via the first bracket and the second bracket as well as the connecting path attached thereto, a chain-like structure is produced which is used on the one hand for decoupling forces, and on the other hand for holding the connecting current path on the surge arrester, or vice versa.

It is advantageously also possible for the connecting path to have a flexible line, at least in places.

The use of a flexible line makes it possible, for example, to short-circuit the universal joint without excessively restricting possible relative movements. However, it is also possible for the flexible line to continue directly or indirectly adjacent to the universal joint, for example over the connecting path disconnecting device, thus forming a connecting path which is intrinsically flexible. In this case, it is possible for the flexible line to be provided, if required, with a protective sheath, which possibly provides electrical insulation. However, it is also possible for bare metallic conductors to form the flexible line.

Connecting paths may have a flexible line both at the first connecting terminal and at the second connecting terminal. If required, however, it is also possible for only one of the connecting paths to have a flexible line.

BRIEF DESCRIPTION OF THE SEVERAL VIEWS OF THE DRAWING

One exemplary embodiment of the invention will be described in more detail in the following text, and is illustrated schematically in a drawing, in which.

DESCRIPTION OF THE INVENTION

Figure 1:
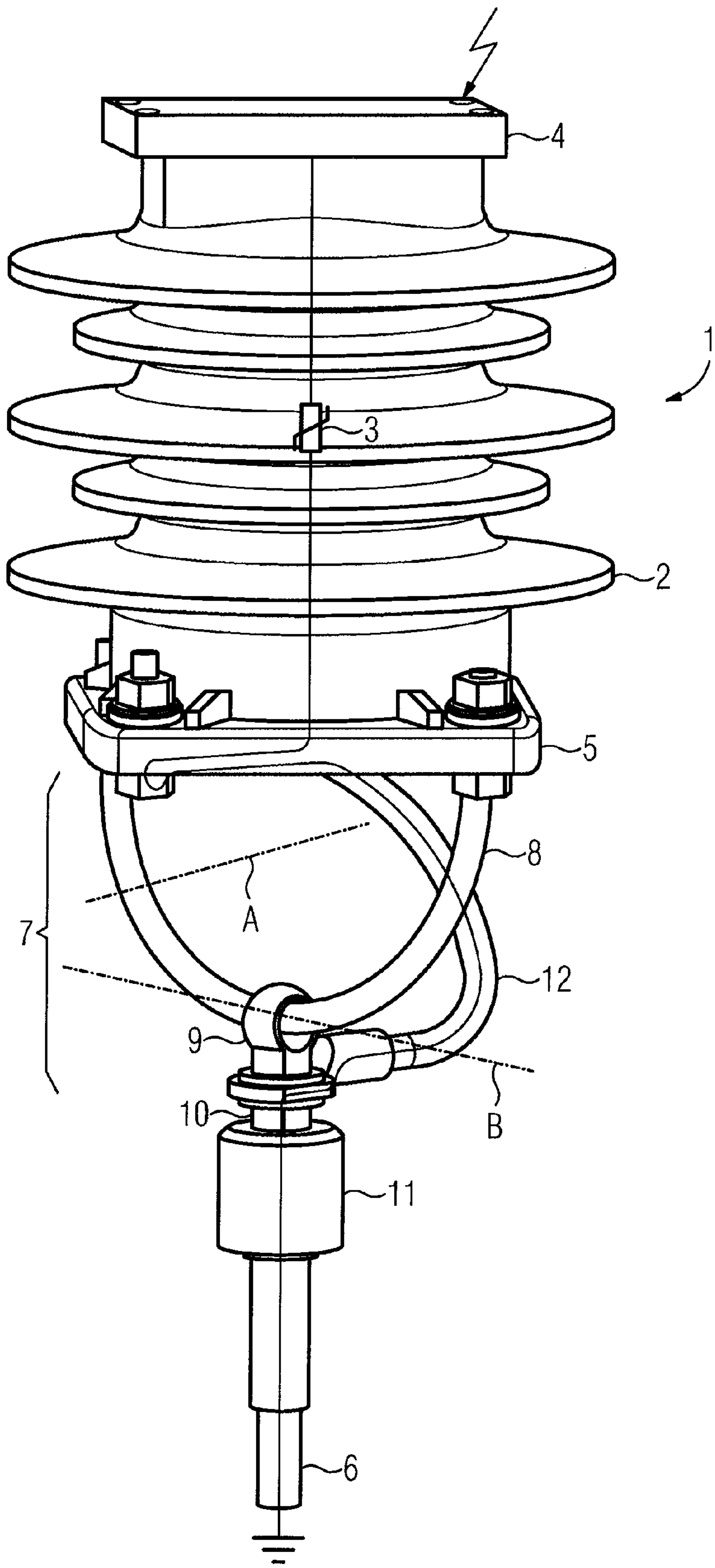
FIG. 1 shows a first embodiment variant of a surge arrester having a first universal joint.

FIG. 1 shows a perspective view of a first embodiment variant of a surge arrester 1. The first embodiment variant of the surge arrester 1 has an electrically insulating housing 2 with ribs. The electrically insulating housing 2 surrounds a varistor element 3, which makes contact via electrical supply lines with a first connecting terminal 4 and a second connecting terminal 5. The connecting terminals 4, 5 are used on the one hand to make electrical contact with the surge arrester. On the other hand, holding apparatuses can be fitted to them, in order to position the first embodiment variant of the surge arrester 1. The two connecting terminals 4, 5 are in this case designed to be identical, and each have a rectangular end surface. Through-openings are provided at each of the corner points of the rectangular end surfaces of the connecting terminals 4, 5. By way of example, bolts can be inserted into these through-openings, and can be positioned on the connecting terminals 4, 5 by means of threads located on the bolts, and nuts fitted to them. The bolts are preferably intended to connect the connecting terminals to a connecting path. One such connecting path may, for example, have a flexible line. A connecting path on the voltage side can be connected to the first connecting terminal 4. A connecting path 6 on the ground side is connected to the second connecting terminal 5 in the figure. The profile of the connecting path 6, on the ground side, is symbolized by a solid line in the respective elements of the connecting path.

A first embodiment variant of a universal joint 7 is provided in order to hold the connecting path 6, with the first embodiment variant of the universal joint 7 having a first bracket 8 and a second bracket 9. The first bracket 8 is formed by a round wire which is bent in a U-shape and is provided with threads at its free ends. In this case, the design of the first bracket 8 is chosen such that the free ends can be inserted into through-openings in the second connecting terminal 5. The first bracket 8 is connected via corresponding screw connections at a fixed angle to the second connecting terminal 5 of the first embodiment variant of the surge arrester 1. In this case, the first bracket 8 is fixed by two through-openings, which are diagonally opposite in the corners, of the second connecting terminal 5. The second bracket 9 is in the form of an intrinsically closed eye, with the first bracket 8 passing through the eye. The bending radius of the second bracket 9 is substantially less than that of the first bracket 8. The eye in the second bracket 9 is chosen to be only slightly larger than the cross section of the first bracket 9. The eye is bounded by a circular-cylindrical envelope surface. This limits the clearance between the brackets, and a relative movement between the joint elements is achieved by superimposed movements in essentially two directions. The first bracket 8 allows the connecting path 6 to move about a first axis A. The second bracket 9 allows the connecting path 6 to move about a second axis B.

The first axis A and the second axis B are preferably aligned orthogonally with respect to one another. When the movements which are possible about the two axes A, B are superimposed, the connecting path 6 is suspended such that it can oscillate freely. A threaded bolt 10 is integrally formed on the second bracket 9. A connecting path disconnecting device 11 is screwed onto the threaded bolt 10, and merges into a flexible line of the connecting path 6. The connecting path disconnecting device 11 is designed to be rotationally symmetrical. The rotation axis is aligned on the same axis as the longitudinal axis of the bolt 10. A flexible line is connected on the same axis to that end of the connecting path disconnecting device 11 which is remote from the bolt 10.

The universal joint 7, which has the first bracket 8 and the second bracket 9, is bridged by a short-circuiting link 12 in the connecting path 6. The short-circuiting link 12 has cable shoes at its ends, one of which is attached at a fixed angle to the threaded bolt 10, and the other rests at a fixed angle on the second connecting terminal 5. If parts of the brackets 8, 9 are used to hold the cable shoes, then these are parts of the connecting path 6.

Figure 2:
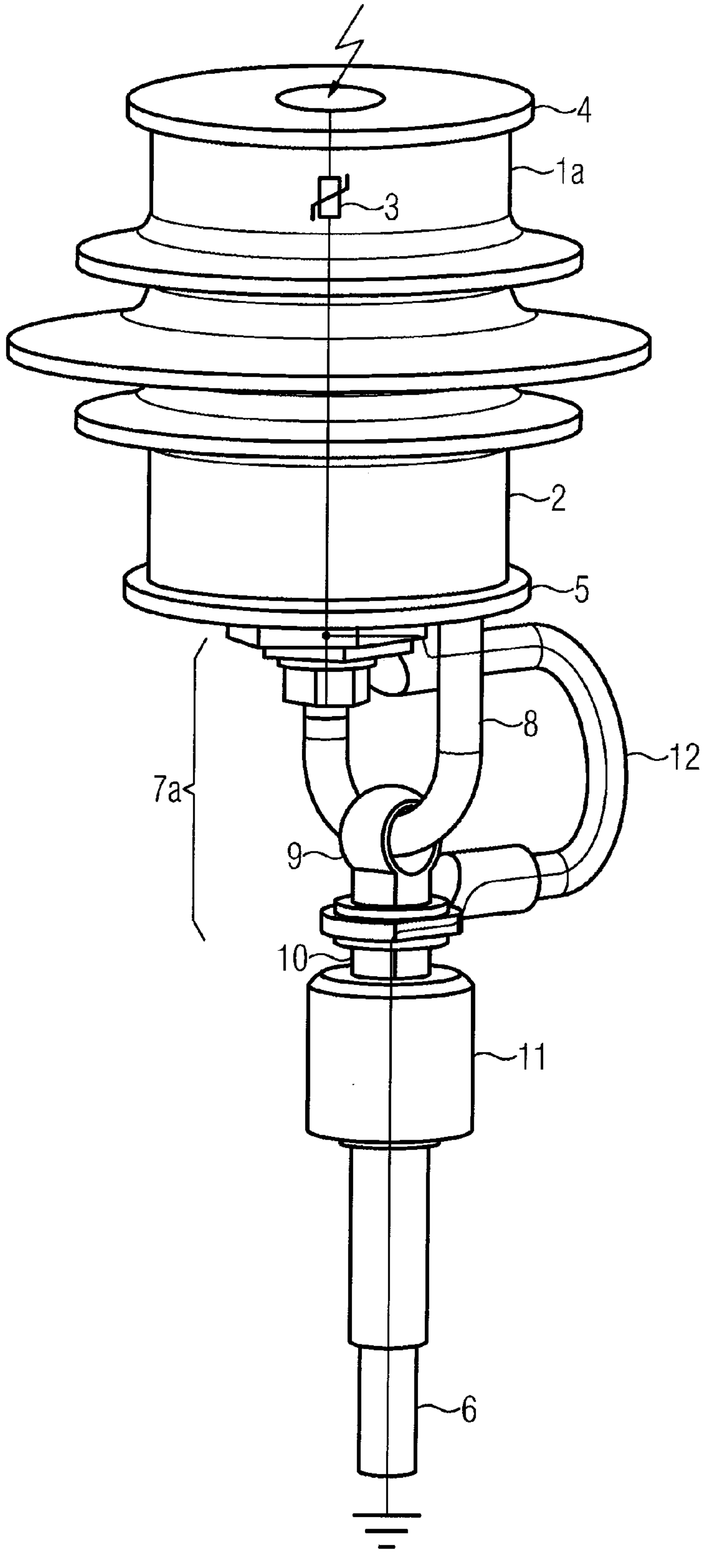
FIG. 2 shows a second embodiment variant of a surge arrester having a second universal joint.

FIG. 2 shows a second embodiment variant of a surge arrester 1*a*. The second embodiment variant of a surge arrester 1*a* is in principle designed to be the same as the first embodiment variant of a surge arrester 1 as shown in FIG. 1. The housing 2, the varistor element 3 and the connecting terminals 4, 5 have the same functionalities both in the first embodiment variant and in the second embodiment variant of a surge arrester 1, 1*a*. All that varies is their physical embodiments. For example, the connecting terminals 4, 5 in the second embodiment variant of the surge arrester 1*a* are equipped at each of their ends with a circular surface and with a centrally arranged hole like a blind hole, which is provided with an internal thread. This internal thread can be used, on the one hand, for mechanically holding the second embodiment variant of the surge arrester 1*a*, while on the other hand provides an electrical contact for the connecting terminals 4, 5.

The following text describes a contact of the second connecting terminal 5 in the second variant of the surge arrester 1*a*. A second embodiment variant of a universal joint 7*a* has a first bracket 8, which is in the form of a round wire and is bent essentially in a U-shape. The two free limbs of the first bracket 8 are of different lengths, with the longer limb being provided with an external thread which is designed to mate with the internal thread that is provided in the central hole in the second connecting terminal 5. The first bracket 8 can therefore be screwed into the second connecting terminal 5, to be precise to a sufficient depth that the limb which has not been inserted into the hole rests on the second connecting terminal 5. This prevents a second bracket 9, through which the first bracket 8 passes, from sliding out. The second bracket 9 has the same design configuration as the second bracket 9 in the first embodiment variant of the universal joint 7. In this case as well, the second bracket 9 has a structure like an eye, with the bending radius of the second bracket 9 being less than the bending radius of the first bracket 8. A short-circuiting link 12, which is provided with cable shoes at the end, makes contact at a fixed angle at its first end on a threaded bolt 10 which is integrally formed on the second bracket 9. The short-circuiting link 12 is placed with the second end of the short-circuiting link 12 and the cable shoe that is arranged there onto the end of the first bracket 8 of the second embodiment variant of the universal joint 7*a*, which is screwed into the central hole in the second connecting terminal 5. The cable shoe is pressed against the second connecting terminal 5 using a nut. This results in an electrically conductive connection between the second connecting terminal 5 and the threaded bolt 10 of the second bracket 9, with the second embodiment variant of the universal joint 7*a* being bridged by the connecting path. The connecting path 6 can now be electrically conductively connected to the threaded bolt 10 of the second bracket 9. In the present example, a connecting path disconnecting apparatus 11, as known from FIG. 1, is once again inserted. The connecting path 6 is held on the second variant of the surge arrester 1*a* via the second variant 7*a* of the universal joint, with the first bracket 8 and the second bracket 9, and makes electrically conductive contact with it. As in the case of the arrangement shown in FIG. 1, the threaded bolt is aligned radially with respect to the eye in the second bracket 9. The surge arrester disconnecting apparatus 11, in its rotationally symmetrical form, has a rotation axis. The rotation axis is aligned radially with respect to the hole in the eye of the second bracket 9. The surge arrester disconnecting apparatus 11 is supported by the second universal joint 7*a*.

Furthermore, even more variants of the refinement of a universally jointed suspension of a connecting path 6 can be provided, thus allowing a pendular movement by superimposition of a plurality of axes, which are defined by the universal joint.

The invention claimed is:

1. A configuration, comprising:

a surge arrester having a first connecting terminal being connected to a transmission line and a second connecting terminal;

an electrically conductive connecting path being supported in a universally jointed manner, said connecting path being fitted to said second connecting terminal for making contact with said surge arrester, and said connecting path being a connection between said second connecting terminal and ground;

a universal joint held by said second connecting terminal, said universal joint having two brackets engaging in one another; and a connecting path disconnecting device disposed between said second connecting terminal and said connecting path, said disconnecting device being attached at a fixed angle to at least one of said brackets, said disconnecting device being configured for interrupting said connecting path in the event of a fault.

2. The configuration according to claim 1, wherein said universal joint is short-circuited by said one connecting path.

3. The configuration according to claim 1, wherein said connecting path is attached at a fixed angle to at least one of said brackets.

4. The configuration according to claim 1, wherein said brackets have different bending radii.

5. The configuration according to claim 1, wherein at least one of said brackets is connected at a fixed angle to said second connecting terminal.

6. The configuration according to claim 1, wherein said connecting path has a flexible line, at least in sections.

* * * * *